Feb. 5, 1952 R. W. LIPP 2,584,393
CIRCLE DIVIDING MACHINE
Filed May 8, 1948 5 Sheets-Sheet 1
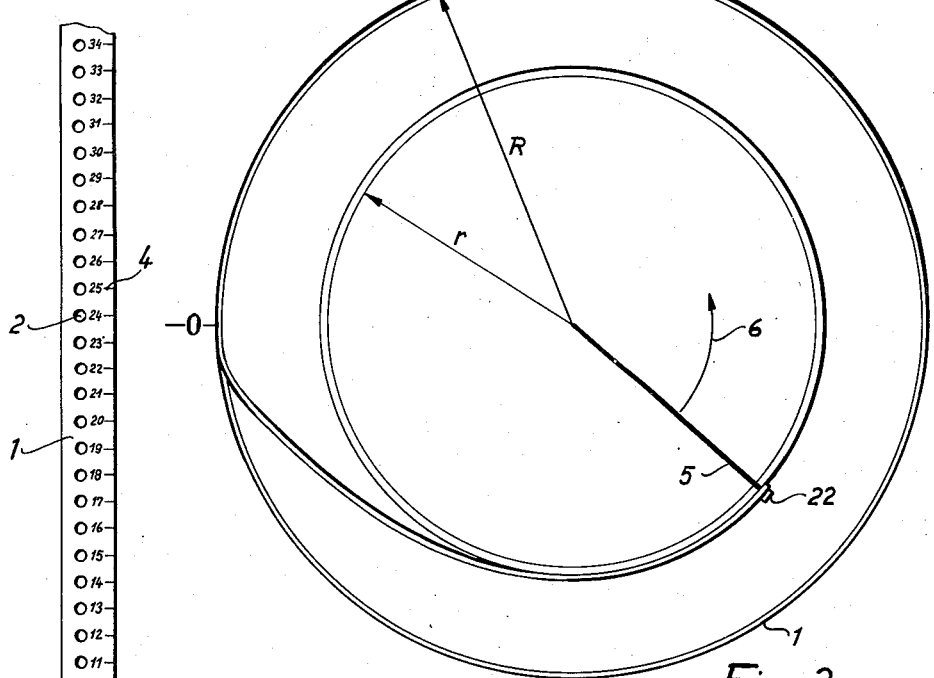
Fig. 3
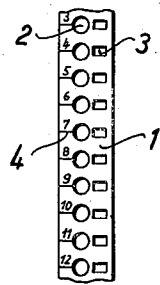
Fig. 1
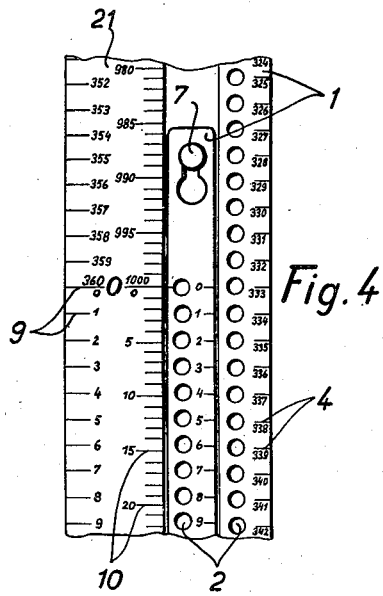
Fig. 2
Fig. 4
INVENTOR:
RUDOLF WILHELM LIPP
BY K. A. Mayr
ATTORNEY.

Feb. 5, 1952     R. W. LIPP     2,584,393
CIRCLE DIVIDING MACHINE

Filed May 8, 1948     5 Sheets-Sheet 2

INVENTOR:
RUDOLF WILHELM LIPP
BY
K. A. Mayr
ATTORNEY.

Feb. 5, 1952    R. W. LIPP    2,584,393
CIRCLE DIVIDING MACHINE
Filed May 8, 1948    5 Sheets-Sheet 3

INVENTOR:
RUDOLF WILHELM LIPP
BY K. A. Mayr
ATTORNEY.

Feb. 5, 1952  R. W. LIPP  2,584,393
CIRCLE DIVIDING MACHINE
Filed May 8, 1948  5 Sheets-Sheet 4
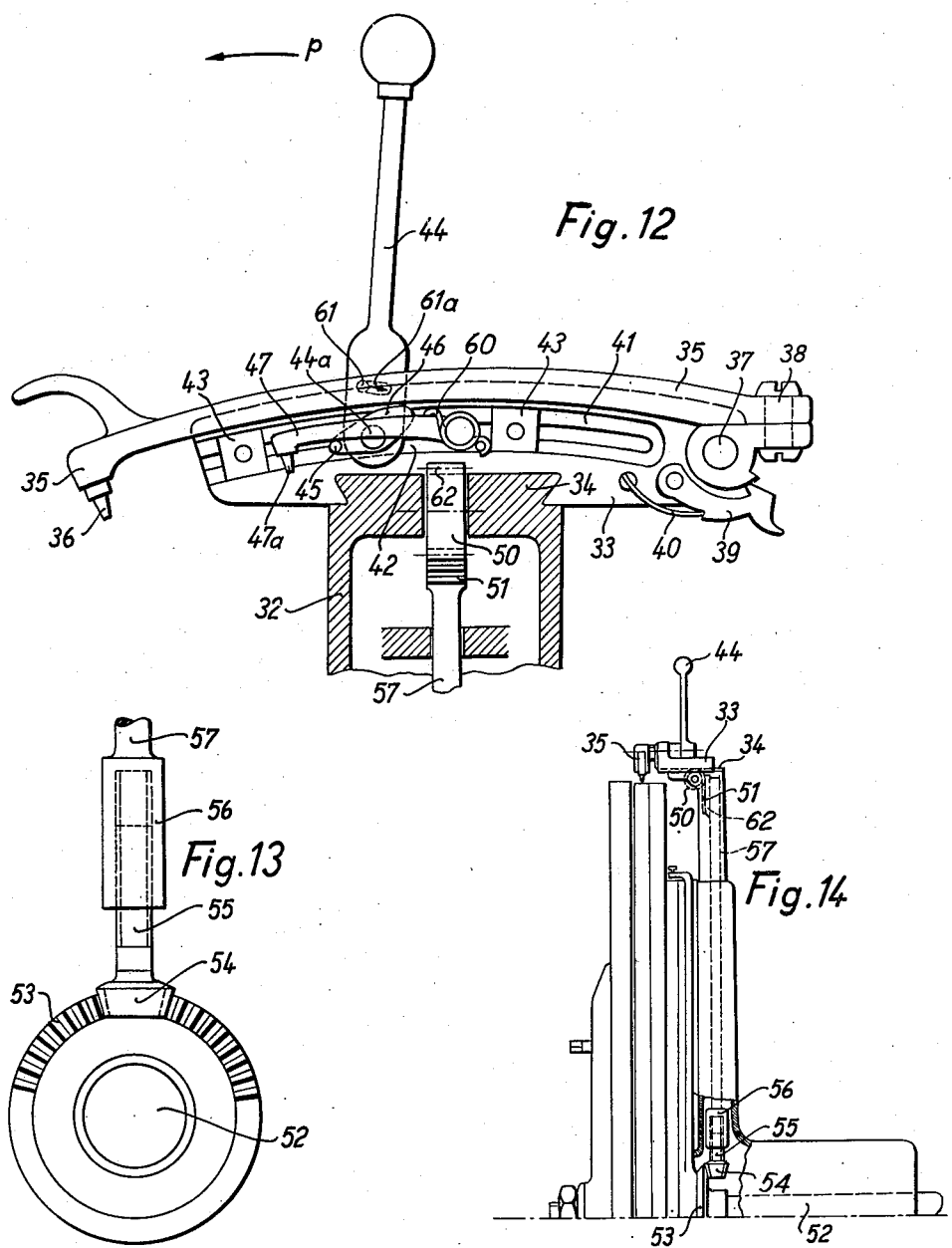
INVENTOR:
RUDOLF WILHELM LIPP
BY
K. A. Mayr
ATTORNEY.

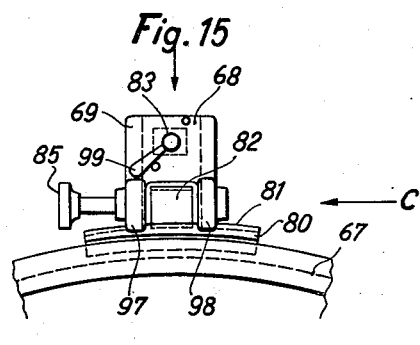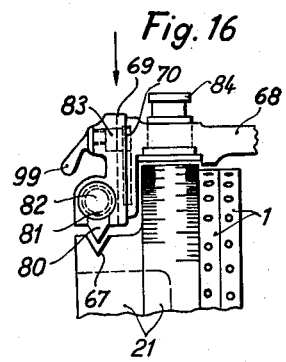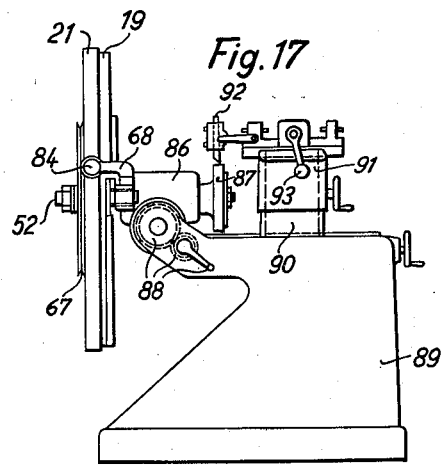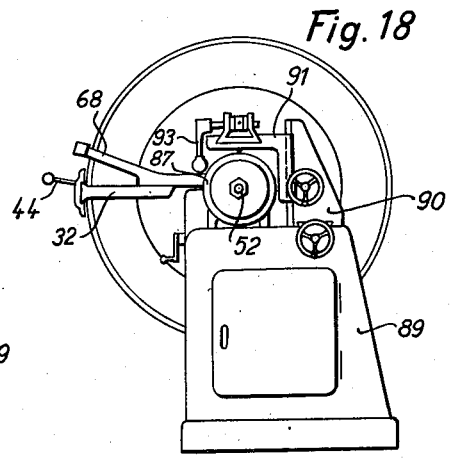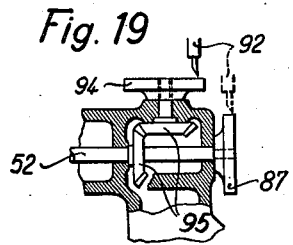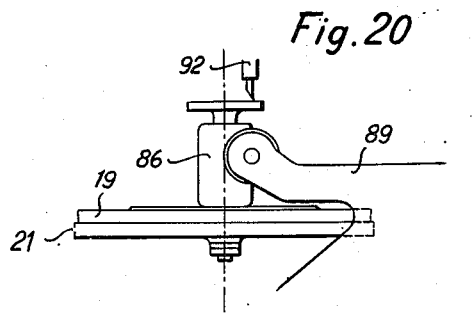

Patented Feb. 5, 1952

2,584,393

UNITED STATES PATENT OFFICE 2,584,393

CIRCLE DIVIDING MACHINE

Rudolf Wilhelm Lipp, Graz, Austria

Application May 8, 1948, Serial No. 25,871
In Switzerland September 15, 1947

12 Claims. (Cl. 33—19)

1

The known machines for dividing circular arcs start from the graduation into degrees or new-degree. A degree is the 360th part of a circle, while a new-degree designates the 1000th part of a circle. Hence, each part is equivalent to a fraction of the circumference to which it refers stated in degrees or new-degrees. For the divisions a worm gear transmission is used or a direct reading from the master scale by means of a microscope is provided. In the first case, viz., the use of a worm and worm wheel, suitable intermediate wheel gearings have always to be calculated and adjusted for attaining the required division. In case of intricate requirements such as often happen when manufacturing scales for electric implements, particularly for the high frequency technique, such devices will often prove absolutely inadequate. For instance, if 349 degrees are to be divided into 333 parts, or if preliminarily gauged distances are to be subdivided into a certain number of sections and in many similar cases a complicated calculation is unavoidable, and a voluminous set of gear wheels is required, the latter reducing the accuracy in spite of the great cost. The second method, the direct reading from the master scale requires the calculation of the amount of the single sections in degrees, minutes and seconds. When manufacturing abnormal scales this work absorbs a particular long time as the operator is compelled to adjust on the master scale the correct values—ascertained by calculation—in degrees, minutes and seconds, proceeding from division to division, for which purpose he has to employ a microscope. This process is a continuous source of errors and inaccuracies and requires unflagging attention and time.

The first object of the invention is to eliminate the drawbacks of both dividing methods, doing away with the calculation of the gear wheels as well as with the necessity to adjust each individual graduation according to degrees, minutes and seconds by using a microscope.

The substantial feature of the invention consists therein that on a dividing disc or head having an invariable radius—in the following named "the master disc"—carrying on its cylindrical circumference a graduation of 360 degrees (old system) and/or of 1000 degrees (new system) a second dividing disc or head—in the following named the "carrier disc"—is provided having a variable radius, and carrying a flexible band provided with equally spaced graduations, the one end of said flexible band being fixed on the carrier disc in such a way that, after the

2 zero graduations of the band and the master disc have been brought into alignment by changing the diameter and thereby the circumference of the carrier disc, the required figure of the graduation on the band is brought in a position corresponding to the number of the degrees of the angle to be subdivided on the master scale.

The advantage attained by this arrangement consists preferably in the fact, that the scale on the master disc of invariable radius is generally only used for determining the circles or circular arcs to be subdivided, whilst for the division of the angles determined in this manner a dividing system is employed, connected with the said scale, but working perfectly independently of it.

Conformably to the above explanations the new system of division resides in that the flexible band provided with equally spaced graduations and stretched over the periphery of the carrier disc of variable diameter, embraces with its graduations, angles varying in conformity with the variations of the diameter of the disc.

This system can be employed for optionally subdividing any circular arc, the circumference of the carrier disc with variable radius being altered in such a manner that the graduation of the band corresponding to the divisor extends exactly over the angle to be divided and determined by means of the scale on the circumference of the invariable master disc or head. Thus the individual points of the division are determined by the position of the graduation and may be fixed by an index or fixing pin engaging corresponding holes of the flexible band. For the feeding from one point of division to another a semi- or fully-automatic device may be employed.

The adjustment of the machine is simple and easy and is carried out in two steps. First, as mentioned above, the angle to be divided must be fixed by means of the graduation on the master disc, whereupon the divisor is to be adjusted to the mentioned angle by operating a crank thereby altering the circumference of the carrier disc. These are the two operations required for adjusting the machine. No wearisome and time consuming calculations are necessary; no complicated and voluminous gear wheels are required. All difficulties characterizing the dividing machines known up to now are avoided, and also the problem of the so-called undividable figures.

The drawings show embodiments of the invention by way of example;

Fig. 1 being a part of a flexible graduated band,

Fig. 2 a part of such band of another form of execution, and

Fig. 3 a diagrammatical illustration showing how to employ the said band;

Fig. 4 represents a portion of the graduation of the master disc and of the band according to Fig. 1, whilst the Fig. 5 is a front view of the carrier disc of variable diameter showing several details in a section, Fig. 6 is a lateral view of Fig. 5, Fig. 7 shows a detail of another embodiment of the elements constituting the carrier disc variable with respect to the radius, and thereby with respect to the circumference, whereas Fig. 8 represents, on a larger scale, a part of Fig. 5

Fig. 12 illustrates the control mechanism of the master and the carrier discs partly in section.

Fig. 13 illustrates a detail of the control mechanism,

Figure 5:
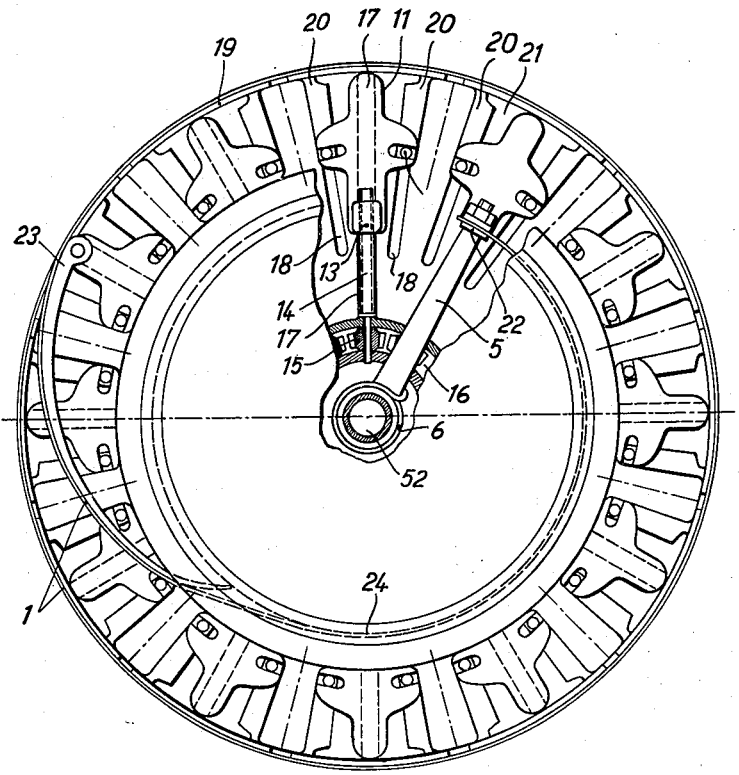

Fig. 14 the control mechanism together with a partial view of the dividing machine itself.

Fig. 15 is a front elevation of a fine adjustment device, whereas

Fig. 16 shows the device according to Fig. 15 seen in the direction of the arrow C.

Fig. 17 is a side view of the dividing machine as a whole,

Fig. 18 is a side view of Fig. 17.

Fig. 19 shows a drive of two fixing tables, whilst

Fig. 20 represents a detail visible in Fig. 17 but in a different position.

As appears from the drawings, the division of a circle or of a circular arc is effected by means of a steel band 1 (Fig. 1) or the like, said band or tape being, f. i., about 10 mm. wide and 1 mm. thick. The tape is provided with holes 2 whose distance from each other may be arbitrary, but must always be equal for all holes. By the side of these holes 2 a scale 4 is arranged with progressive figures. If this tape which may, e. g., be provided with 500 holes and graduations is then bent to form a circle having the radius R, as to be seen from Fig. 3, in such a manner that the zero hole coincides with the hole of the divisor of the angle to be divided (e. g., 333) and with the zero line of the whole angle to be divided (e. g., 360°) (Fig. 4) the subdivisions desired of the whole angle are adjusted. The superfluous end of the tape (band) 1 is inwardly rolled up to a smaller radius r by the spring lever 5 in the direction of the arrow 6. Of course the tape or band 1 is to be tensioned on a disc (head) of variable diameter, the so-called carrier disc. The holes 2 of the tape 1 are used for arresting the tape and the mentioned disc in the individual graduation points by means of an index (stopping) pin, and for the semiautomatic or fully automatic transport from one graduation point to the following. For protecting the holes 2 against premature wear and tear a second series of holes may, according to Fig. 2, be arranged parallelly to the holes 2, said holes 3 serving exclusively for transporting purposes. The aforementioned carrier disc or head is connected to a master disc (head) 21 of invariable diameter, the details of the construction being set forth hereunder. The disc 21 whose graduated section is shown in Fig. 4, may be provided with different scales i. e. with a scale 9 of 360° (old system) and with a scale 10 of 1000° (new-degree). The zero point of these scales must coincide with the zero-hole of the tape (band) 1 but a displacement of the zero positions of the two scales in respect to each other is permissible provided that the index pin is displaced to the same extent.

If, e. g., 350 degrees are to be divided into 299 parts, the diameter of the carrier disc, the construction of which will be described later on in detail with reference to Fig. 5, must be reduced till the hole of the tape (band) 1 marked 299 coincides with the mark 350° on the circumference of the master disc 21. If, e. g., a tape of 500 holes is employed, all divisions below 500 can be carried out therewith, and if the reduction of the circumference of the segment is only possible down to 250 holes—the division with a divisor between 500 and 250, may be made directly and with a smaller divisor by skipping over one or several holes, i. e., by a process according to which one or several holes are left out in the course of progressive adjusting.

If, e. g., 300 degrees are to be divided into 124 parts the disc 21 is first adjusted to 300 degrees according to Fig. 4 whereupon the tape (band) 1 is adjusted to 248, i. e., the double of the desired parts, so that by skipping over one hole at a time the desired division is attained.

The adjustability of the carrier disc must allow an adjustment of the circumference for at least the half of its greatest circumference; if, f. i., the band is provided with 500 holes the circumference of the disc must be diminished in such a degree that it corresponds to 250 holes or less.

In this manner all divisions can be made as the multiplication of the divisor with whole numbers cannot give another result than a whole number. Instead of a perforated band also a millimeter tape or the like can be used, in which case the graduations are made to coincide, and the subdivisions to be read.

Figure 6:
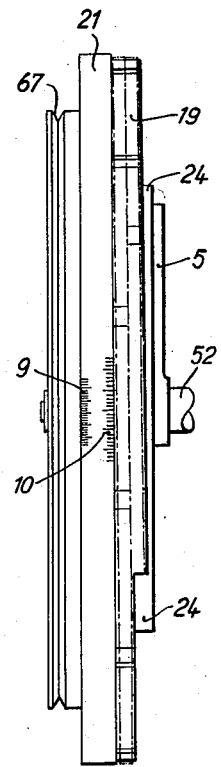
Figure 8:
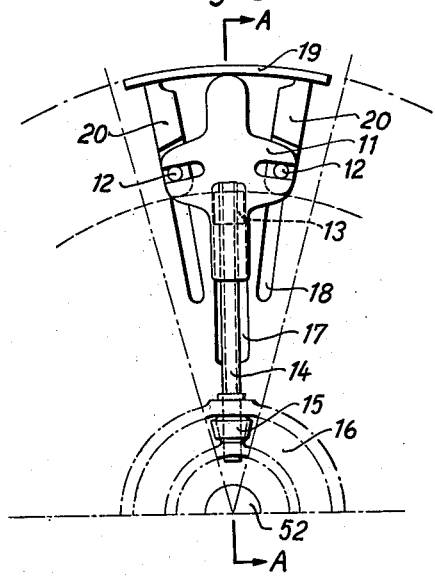
Figure 9:
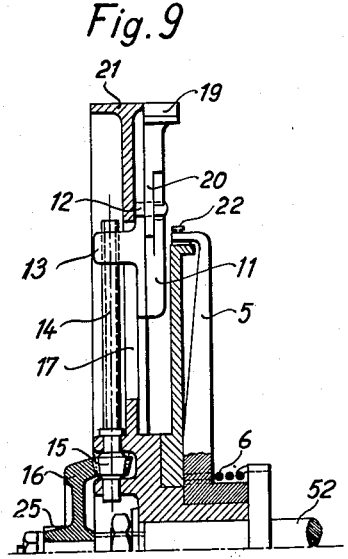
Fig. 9 is a section taken on the line A—A of Fig. 8.

The Figs. 5 and 6 illustrate a master disc (head) 21 whose circumference is provided with the scales according to Fig. 4 and which, at the same time, supports the segments 11 shown in Figs. 8 and 9. The flexible outer parts 19 of these segments 11, arranged in a circle, constitute a circular disc or drum, around which the perforated flexible tape (band) 1 is wound. The individual segments 11 (Fig. 8 and Fig. 9) are provided with a projection 13, projecting through a guiding slot 17, of the disc 21 said projection containing a hole with inside thread into which a threaded spindle 14 supported by the disc 21 may be inserted. The projection 13 is guided in the slot 17 of the disc 21. A bevel pinion 15 is fastened on the spindle 14 near its inner end, and all pinions 15 engage a pinion 16 rotatably arranged on the disc 21 and adapted to be rotated by a socket wrench put on the square 25. By such rotation all segments 11 are radially displaced. Each of the segments 11 is provided with two shanks 20 on which bolts 12 are fastened. The bolts engage slots of the segments and are guided in radial guides 18 provided on the disc 21. The outer ends of the shanks are fastened to flexible rim portions 19. When the segments move towards the axis of the system the two shanks 20 as well as the pins or bolts 12 fastened to same and sliding in the guides 18 come nearer to each other, whereby the flexible rim portion 19 is bent to the shape of the arc corresponding to the radius at the time being. If on the other hand the projections 13 move away from the axis the inverse process takes place, i. e., the length of the circumference of the circle is increased.

Figure 7:
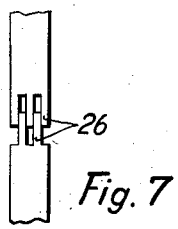

On the segment provided for the zero position the beginning of the perforated tape or band 1 is fixed to a pin 7 by means of a slot (Fig. 4). Then the tape is wound around the rim portions 19 and is guided over the movable guide arm 23 (Fig. 5) to the drum 24 rolling up the band. For this purpose a lever 5 is provided actuated by a spring 6 and being connected with the outer end 22 of the tape (band) 1 thereby tensioning said band 1 corresponding to the reduction of the circumference of the circle formed by the rim portions, the steel band 1, owing to its rigidity, overbridging the intervals between the portions without the theoretically correct shape of the circle being subjected to any perceptible distortion, more particularly as these intervals gradually become smaller up to zero when approaching the small radius $r$ (Fig. 3). But as shown in Fig. 7 the rim parts 19 may also engage each other by projections 26. The arc of the movable guide arm 23 corresponds to the smallest radius attainable by the rim portions.

Figure 10:
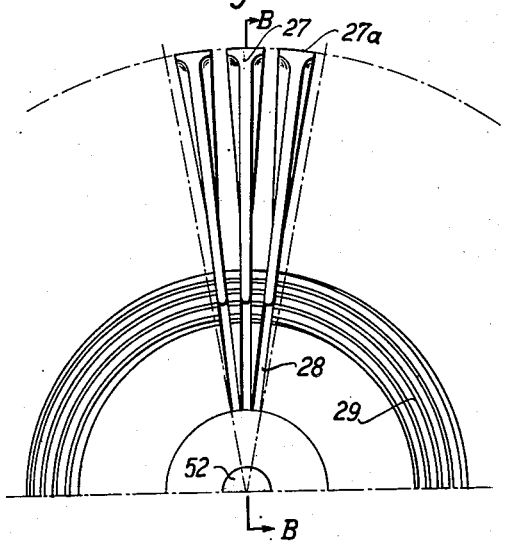
Fig. 10 shows another embodiment of the object shown in Fig. 8.
Figure 11:
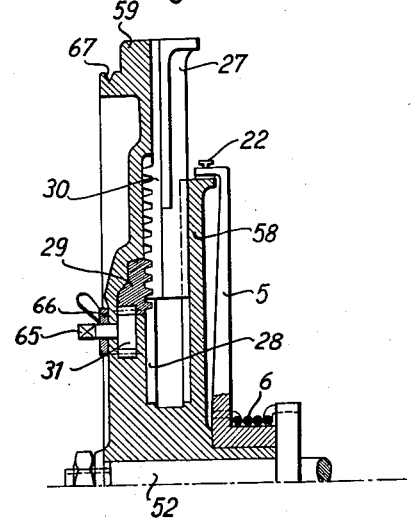
Fig. 11 is a section taken on the line B—B of Fig. 10.

Figs. 10 and 11 show another shape of segments 27 the flange-like outer part 27a of which being made as narrow as possible, and which are guided in the radial slots 28 of two discs 58 and 59 (Fig. 11). The radial displacement of the segments 27 is effected by the rotation of a worm ring 29 engaging teeth 30 of the segments. The worm ring 29 is rotatably supported by the disc 59 and may be rotated by the toothed gear 31 by means of a crank put on the square 65, so that in this manner the radial displacement of the circle formed by the outer parts 27a of the segments is rendered possible.

Fig. 12 shows a device for semi-automatically transporting the band 1 from one point of division to the following. As to be seen from the Figs. 12, 14, 17 and 18, said device is arranged on a slide 33—slidably connected to the guide 34 provided on an adjustable carrier 32. On the slide 33 an index lever 35 is journalled carrying the index pin 36 (Fig. 12). If the device is correctly adjusted the pin 36 may engage the holes 2 of tape 1, in consequence whereof the tape 1 is secured in the position which it occupies at the respective moment.

The index lever 35 together with the index pin 36 is drawn by a spring (not shown in the drawings) in the direction of the band or tape 1; it may horizontally rotate on the pin 37 and vertically on the pin 38, the latter support being provided for enabling the index pin 36 to follow to small deviations, if any, of the band or tape The transport is carried out by moving the handle 44 in the direction of the arrow $p$ to the left hand side (Fig. 12) of the drawing. The handle 44 is attached to a rotatable axle 44a journalled in a slide 42 slidably arranged in a guide 41 provided on the slide 33. If the handle is moved to the left hand side it first turns the axis 44a together with the cams 45 and 46 coaxially fastened to it. The cam 45 engages the lower face of a pawl 47 rotatably supported by the slide 42 and being provided with a pin 47a. When turning with the axis 44a the cam 45 moves downwards, thereby allowing the pin 47a of the pawl 47 to engage—under the action of the spring 60—the opposite hole of the band (tape) 1. When the handle 44 is further tilted to the left, the cam 46 lifts the index lever 35, thereby disengaging the index pin 36. In other terms the carrier disc of variable radius carrying the rim portions 19, and the tape (band) 1 is released so as to be adjusted to the following partition point. A further movement of the handle 44 to the left causes a pin 61 fastened on the handle to butt against the left end of a slot 61a, providing in a part of the slide 42, whereby the tilting motion of the lever 44 is arrested so that a further pressure against the handle causes a shifting motion of the slide 42 leftward in the guide 41 until said slide 42 butts against a block 43 adjustably arranged on said slide 33, whereby the motion is terminated. The return movement of the handle 44 first causes the cam 46 to descend, thereby allowing the lever 35 to turn downwardly so that the index pin 36 engages the opposite hole. In this position both the index pin 36 and the pin 47a of the transport pawl 47 engage the band 1. Then the pin cam 45 lifts the transport pawl 47, the pin 61 abuts against the right end of the guide slot 61a of the slide 42 so that by a further movement of said handle towards the right, slide 42 is brought towards a second block 43 into its initial position; said block being adjustably arranged on the slide 33 and stopping the movement of the slide 42. When releasing the handle 44 the transport pawl 47 is lowered by the pressure of the spring 60 so that again both pins 36 and 47a are in engagement. The fit of the slide 42 should have very little play to avoid a shifting movement before the pin 61 contacts the respective ends of the slots 61a. The two blocks 43 are adjustable for the purpose to limit the motion of the slide 42 in correspondence with the number of holes for which the band 1 is to be fed.

A locking pawl 39 rotatably arranged on the slide 33 and actuated by a spring 40 serves to continually keep the index lever 35 out of engagement, if required.

The entire system can be withdrawn from the guide 34 of the slide and be substituted by a microscope holder.

As the perforated band 1 is laid around the rim portions 19 in a helical line, the index lever 35 (Fig. 12) should follow the helically arranged hole series. This lateral displacement of the lever 35 and the slide 33 takes place in such a way that the transport pawl 47 is forced to follow the helical movement of the hole of the band 1 engaged by the pawl. As the pawl 47 is guided by the guide 41 rectangularly relatively to the axis of rotation of the disc carrying the band 1 the whole transporting device including the slide 33 is subjected to a laterally directed push corresponding to the obliquity of the band. Consequently, the index pin 36 of the lever 35 is placed exactly opposite the hole to be engaged. The lateral displacement of the transport system however may be assisted by a positively acting additional device. A rack 62 (Figs. 12, 13 and 14) connected to the slide 33 is engaged by a toothed wheel 50 supported by the carrier 32. A rack 51 also engaging said wheel 50 is provided on the upper end of a rod 57 slidably but not rotatably supported by said carrier 32 and having fastened to its lower end a sleeve 56 provided with an inside thread. The sleeve is engaged by a threaded rod 55 to the lower end of which a bevel wheel 54 is attached engaging a second bevel wheel 53 fixed on the axis 52 of the disc 21. If the disc 21 with the carrier disc on the axis 52 rotates during the action of the transporting pawl 47, the bevel wheel 53 rotating with said axis rotates the bevel wheel 54 and the threaded rod 55 firmly connected to the last mentioned wheel. In consequence of the engagement of the threaded rod 55 with the inside thread of the sleeve 56 and in consequence of the fact that said sleeve may axially move with the rod 57 but is prevented from turning, the sleeve 56 and rod 57 are axially shifted if the rod 55 is rotated. The shifting movement of the rod 57 with its rack 51 rotates the toothed wheel 50 which, in turn, moves the rack 62 and thereby laterally displaces the slide 33 with the whole transporting device. The bevel wheels are so dimensioned that one entire revolution of the bevel wheel 53 causes a lateral displacement of the slide 33 corresponding to the pitch of the helical line of the band 1.

The Figs. 15 and 16 represent a fine adjustment device. The supporting arm 68 (Fig. 18) carrying the microscope 24 is provided on its end with a guide 70 along which a slide 69 may slide downwardly actuated by a spring. The slide is provided with two bearing blocks 97 and 98 in which a worm 82 provided with a fine adjustment button 85 is rotatably journalled. Numeral 80 refers to a circular segment supported and guided by the slide 69, the one curved face of which having a wedge-shaped cross section engages a wedge-shaped groove 67 of the disc 21 for the purpose of arresting said disc in any desired position, by turning the handle 99, thereby causing the eccentric 83 to release the slide 69 which then slides downwardly under the action of its spring. By the pressure of the slide 69 transmitted by the bearing blocks 97 and 98 to the worm 82 and thence to the segment 80, any play preventing the arresting of the disc 21 is avoided. The fine adjustment is made by turning the button 85 and therewith the worm 82, engaging a worm gear on the upper side of the segment. By turning the handle 99 upwardly the slide 69 is lifted so that the circular segment 80 and the disc 21 may again freely move.

The Figs. 17 and 18 are general views of the dividing machine composed of the elements hitherto described.

Numeral 86 designates a tiltable casing in which the axle 52 carrying the disc 21 and the parts fastened on it is rotatably journalled, whereas numeral 87 refers to a flange screwable on the axle 52 and adapted to support the workpiece. 88 is a gearing having a crank for tilting the casing 86 together with the other elements through an angle of 90°, as shown in Fig. 20, while 89 designates the machine frame, 90 a horizontal slide and 91 a vertical slide serving for adjusting the tool—in the present case a line tracing device 92—into the desired position. The slide 91 may also be provided with a boring and milling device (not shown) which may be optionally exchanged for the removable line tracing device 92. The Fig. 19 shows an arrangement of fixing plates 87 and 94 in which tilting by means of the device 88 (Fig. 17) is only required up to 45 degrees for the purpose of executing divisions on drums having conical surfaces. The plate 87 is fixed on the shaft 52 and the plate 94 is connected with said shaft by means of a bevel gearing 95 so that both plates are commonly driven by the shaft 52.

The machine operates in the following manner:

If a drum is to be provided with a scale, said drum is fixed on the plate 87 (Fig. 17). The desired division is adjusted as described above, and the graduations are traced by means of the tracing device (diamond) 92 operated by the lever 93. If the scales are to be made on a flat, even surface the system 88 (Fig. 17) is operated for moving the plate 87 into its horizontal position (Fig. 20) whereupon the tracing device is brought into the appropriate position by means of the slides 90 and 91. If the arrangement according to Fig. 19 is used, the plate 94 is employed for the operation in question.

By means of the dividing machine described practically all divisions can be carried out without difficulty, in a very short time, and with the greatest accuracy. This refers to the division of any circular arcs. If according to the above example 349 degrees are to be divided into 333 parts, the diameter of the variable radius disc (carrier disc), comprising the rim portions 19, is to be altered so that, according to the required divisor 333 holes correspond to the angle of 349 degrees on the master disc 21. This manipulation suffices for rendering the machine ready for use so that the making of the scale can begin. In the present case this is done by tracing lines (marks) in another case by milling a toothed wheel or the like.

What I claim is:

1. A machine for dividing circular arcs into any desired number of equal division comprising, in combination with the frame of the machine, a master disc having an invariable diameter, supported by said frame and being provided with at least one scale on its periphery, a carrier disc supported by said master disc and having an optionally adjustable diameter, a flexible band provided with progressively numbered and equally spaced marks, the one end of said band being fixed to said carrier disc in such a position that its zero point is aligned with the zero point of the scale of the master disc, and being wound around said carrier disc, means provided on said discs and adapted to adjust the diameter of said carrier disc in such a manner that any desired mark on the band may be brought opposite to any desired point of the scale on the master disc and means supported by the frame and adapted to adjust the circular surface of a work piece in correspondence with the position of the said marks on the band lying on the adjusted carrier disc.

2. A machine as claimed in claim 1 in combination with means arranged on the master disc, and connected with the second end of said band and adapted to hold it stretched around the periphery of the adjusted carrier disc.

3. A machine as claimed in claim 1 in combination with a curved guiding arm pivotally mounted on said carrier disc near an opening in the rim of the carrier disc and adapted to guide said band through said opening into the inside of said carrier disc, the curvature of the guiding arm corresponding to the smallest circumference of said carrier disc and means arranged on the master disc, connected with the second end of said band and adapted to hold it stretched around the periphery of the adjusted carrier disc.

4. A machine as claimed in claim 1, the said carrier disc consisting of a plurality of radially adjustable segments supported and radially guided by the said master disc, means adapted to commonly adjust said segments in the radial direction, shanks also radially guided by the master disc and operatively engaging said segments so as to participate in their radial movement and rim portions each being connected with two shanks engaging the same segment.

5. A machine as claimed in claim 1, the said carrier disc consisting of a plurality of radially adjustable segments supported and radially guided by the said master disc, means adapted to commonly adjust said segments in the radial direction, shanks also radially guided by the master disc and operatively engaging said segments so as to participate in their radial movement and rim portions each being connected with two shanks engaging the same segment and grooves and projections provided on opposite edges of said rim portions and adapted to engage each other.

6. A machine as claimed in claim 1 the said carrier disc consisting of a plurality of radially adjustable segments provided with flange-like outer parts forming the rim, supported and radially guided by the said master disc and being further provided with teeth, a worm ring engaging said teeth and being rotatably supported by said master disc and means adapted to rotate said worm ring.

7. A machine for dividing circular arcs into any desired number of equal divisions comprising in combination with the frame of the machine, a master disc rotatably supported by said frame, the disc having an invariable diameter, and being provided with at least one scale on its periphery, a carrier disc supported by said master disc and having an optionally adjustable diameter, a flexible band provided with progressively numbered and equally spaced marks, the one end of said band being fixed to said carrier disc in such a position that its zero point is aligned with the zero point of the scale of the master disc, and being wound around said carrier disc, means provided on said discs and adapted to adjust the diameter of said carrier disc in such a manner that any desired mark on the band may be brought opposite to any desired point of the scale on the master disc, means arranged on said frame and adapted to engage said band and to rotate it together with the carrier disc and the master disc for a desired number of marks and means supported by the frame and adapted to adjust the circular surface of a work piece in correspondence with the position of the said marks on the band lying on the adjusted carrier disc.

8. A machine as claimed in claim 7 the means for rotating the band and discs consisting of a slide arranged on the said frame and being slidable in the direction of the axis of the discs, a lever journalled on said slide, an index pin provided on said slide and adapted to engage holes of the band for the purpose of fixing its position, another slide also arranged on the frame and being slidable perpendicularly to the first named slide, a pawl, a pin provided on said pawl and adapted to engage said holes and being journalled in said last mentioned slide and a handle supported by the last mentioned slide and adapted, when moved, to alternately bring said pins into and out of engagement and to move said last mentioned slide, thereby turning the discs around their axis.

9. A machine as claimed in claim 7 the means for rotating the band and discs consisting of a slide arranged on the said frame and being slidable in the direction of the axis of the discs, a lever journalled on said slide, an index pin provided on said slide and adapted to engage holes of the band for the purpose of fixing its position, another slide also arranged on the frame and being slidable perpendicularly to the first named slide, a pawl, a pin provided on said pawl and adapted to engage said holes and being journalled in said last mentioned slide, a handle supported by the last mentioned slide and adapted, when moved, to alternately bring said pins into and out of engagement and to move said last mentioned slide, thereby turning the discs around their axis and a gearing inserted between the said discs and the first mentioned slide and adapted to transform the rotating movement of the discs into a linear movement of said slide for the purpose of enabling the said pins to follow the movement of the marks on said band helically laid around the carrier disc.

10. A machine as claimed in claim 1 in combination with a microscope adjustably supported by said frame and means adapted to adjust it over the scales and marks.

11. A machine as claimed in claim 1 in combination with a microscope supported by said frame, a slide vertically guided on the support of the microscope, a worm rotatably supported by said slide, and a segment shiftably supported by said slide the one circular surface of which being provided with worm teeth and engaging said worm, the other circular surface having a wedge-like cross section and being adapted to engage a groove of wedge-like cross section arranged on the outer circular surface of the master disc.

12. A machine as claimed in claim 1 in combination with a shaft bearing said discs and supported by the frame, said last mentioned means comprising two fixing plates, the one being fixed on said shaft and the other being arranged rotatable around an axis perpendicularly to the axis of rotation of the first mentioned plate and being driven by said shaft by means of a gearing.

RUDOLF WILHELM LIPP.

No references cited.